J. TODD,

Assignor, by mesne assignments, to C. G. MILNOR & J. H. BROWN.

Wringer.

No. 9,432. Reissued Oct. 26, 1880.

Attest:
Courtney A. Cooper
William Paxton

James Todd
By his attorney
Charles E. Foster

N. PETERS, PHOTO-LITHOGRAPHER, WASHINGTON, D. C.

UNITED STATES PATENT OFFICE.

JAMES TODD, OF PITTSBURG, PA., ASSIGNOR, BY MESNE ASSIGNMENTS, TO CHARLES G. MILNOR AND JOSEPH H. BROWN, OF SAME PLACE.

WRINGER.

SPECIFICATION forming part of Reissued Letters Patent No. 9,432, dated October 26, 1880.

Original No. 210,170, dated November 19, 1878. Application for reissue filed June 25, 1880.

*To all whom it may concern:*

Be it known that I, JAMES TODD, of Pittsburg, Allegheny county, Pennsylvania, have invented Improvements in Wringers, of which the following is the specification.

This invention has for its object the improvement of roller clothes-wringers wherein the upper roller is automatically adjustable by means of a spring and set-screws and both the rollers have their bearings on anti-friction wheels; and the invention consists in the combination, with the vertically-slotted side bars of the frame, of sliding boxes arranged outside of said frame, having outside offsets, the journals of the wheels extending through said boxes; in journaling the anti-friction wheels in the offsets of said boxes, and with their perimeters passing each other, thereby lessening the friction of the rubber rollers; in a slide carrying anti-friction wheels, constructed and adapted to the frame so as to be applied thereto with facility and securely retained without interfering with the freedom of its vertical sliding movements; in the construction of the side frame to facilitate the arrangement and the adjustment of the aforesaid parts, and in the construction of the clamping devices.

Figure 1:
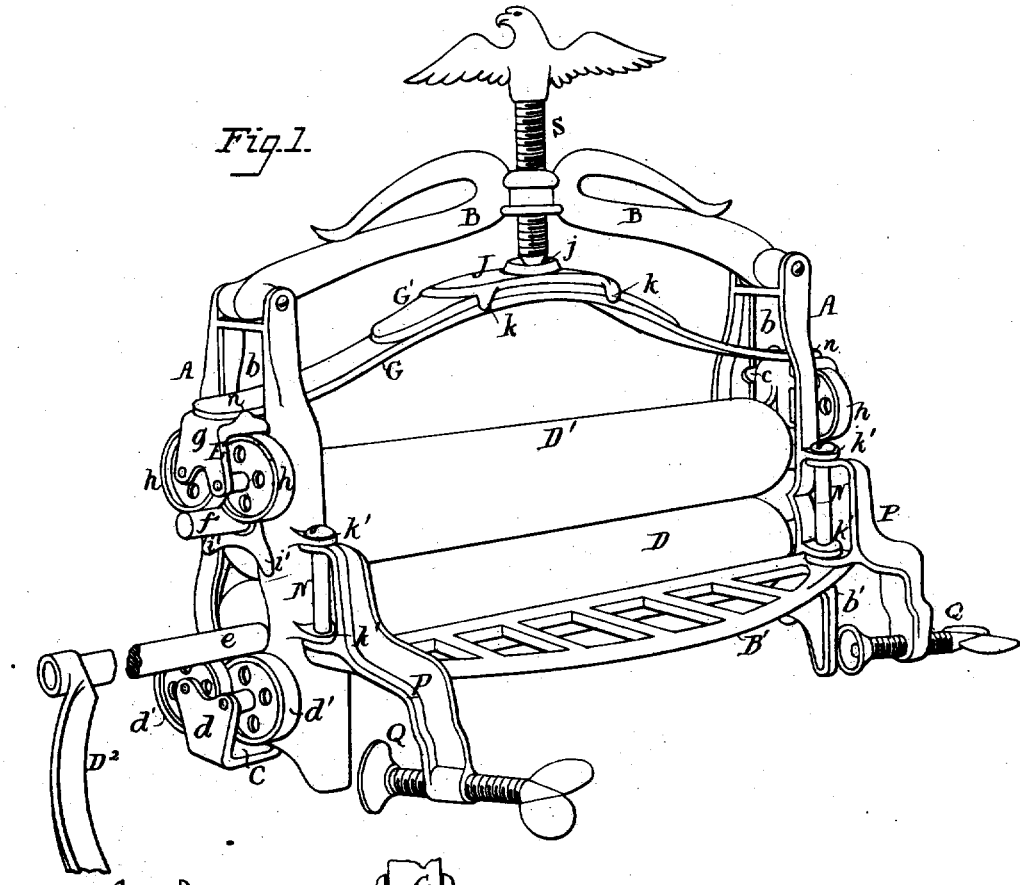
Figure 5:
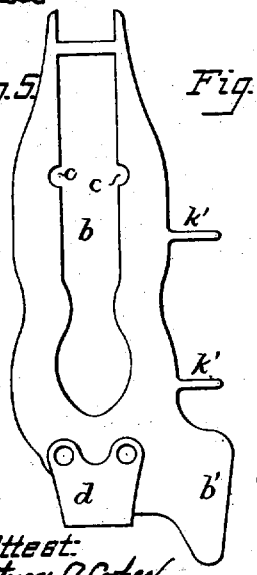
Figure 2:
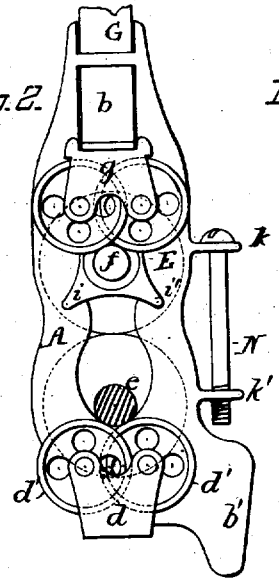
Figure 3:
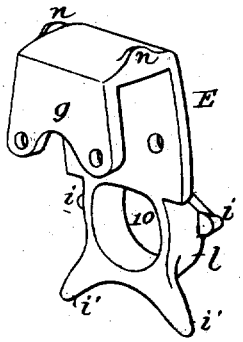
Figure 4:
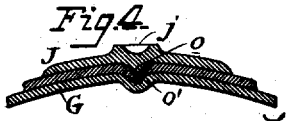

In the annexed drawings, forming part of this specification, Figure 1 of the drawings is a perspective view of my improved wringer. Fig. 2 is a partial end view of the same. Figs. 3 and 4 are detail views, and Fig. 5 a side view of one of the side pieces.

A A designate the side pieces of the wringer-frame, connected together at their upper and lower ends, respectively, by the arched bar B and the horizontal platform B′, the former having a fixed nut, *a*, for the adjusting-screw S, and the latter being made in open-work for the more perfect draining of the water from clothing.

The side pieces, A, have strengthening-flanges at the edges, and in each is a vertical slot, *b*, upon the edges of which, near their upper ends, are notches *c*. The side pieces are provided each with an outside bracket, *d*, forming with the side piece a box, C, in which are the bearings for the steel journals of the anti-friction wheels *d′*. As shown in Fig. 1, these wheels *d′* are arranged side by side, and overlap or extend beyond each other, and afford a rolling bearing of exceptional excellence for the shaft *e* of the lower rubber roller, D. This roller is generally constructed, in the usual way, with an unyielding central portion and a yielding rubber envelope, and its shaft projects through the slot *b* of the side pieces, A, to the anti-friction wheels *d′*.

The upper roller, D′, is provided with a shaft, *f*, extending through the slots *a* aforesaid, and it bears on the roller D, so that when the latter is actuated by a crank-arm, $D^2$, it imparts by frictional contact a rotary movement to the roller D′, by which means gears and other equivalent devices are advantageously dispensed with.

In the slot *b* of each side piece, A, moves a slide, E, having an outside bracket, *g*, and carrying two anti-friction wheels, *h h*, constituting the roller-bearing of the shaft *f* of the upper roller, D′. Each slide E has an opening, 10, through which the shaft *f* passes, the shaft being thereby held in proximity to the wheels and prevented from becoming disconnected from the slide when the latter is raised.

At the lower portion of the slide, and projecting horizontally therefrom a sufficient distance on its side opposite to the wheels *h*, is an offset, *l*, adapted to be received in the slot *a* of the side piece, and provided with guide-lugs *i i′*, sufficiently out of line with each other to admit the thickness of the walls of the side bars, A, between them. This offset is introduced into the slot *b* by passing the guide-lugs *i* through the notches *c* in the edges of the slots *b* until the lugs *i′* come in contact with the side pieces, A. The slide may then be thrust down until the roller D′ bears upon the roller D, as shown in Fig. 1. The slide, its anti-friction bearings, and the roller D′ are thus securely connected to the frame, but so as to be adjustable vertically and readily detachable without removing any screws or other devices.

G is a semi-elliptic spring, the ends of which project through the slots *b* of the side pieces, A, and bear upon the tops of the slides E, lateral displacement being prevented by the lugs *h* on the top of the said slides. This spring may be composed of one or more leaves, G G′, and it is provided with a removable metallic cap, J, having in its upper sides a recess, *j*, and upon its edges the downwardly-projecting lips *k*, that embrace the said spring, and by means of which the said cap is held in position. The under side of this cap corresponds to the curvature of the spring, and is usually provided with a stud, *o*′, adapted to a recess in the leaf or leaves of the spring. This construction, however, is not indispensable, though, with a view to holding the leaves of the spring where two or more are used, it is advantageous. By setting up the screw S the spring is caused to press upon the slides E, thereby forcing the upper into more or less intimate contact with the lower roller, thus regulating the pressure according to the thickness of the fabric operated on, and allowing the upper roller to rise automatically for the passage of buttons or of folds of the fabric.

Each side piece, A, has near the lower inner edge a projecting bearing, *b*′, and above the latter are lugs *k*′ *k*′, to which are jointed the swinging frame P, carrying a horizontal screw, Q, between which and the bearing *b*′ the side of the tub is clamped.

As the projection *b*′ extends beyond the lugs *k*′, the latter are protected and less liable to be broken off than when more exposed. The projections *b*′ further serve as bearings for the platform B′, which is more firmly supported, and may be secured by the same screw-bolts, N, that connect the frames P to their lugs.

It will be noted that the frames P project downward below their pivotal points, so that the edge of the tub may extend fully up to the platform B′, thus bringing the lower roller almost within the tub.

Without claiming an external wheel-bearing or the combination therewith of slides carrying anti-friction wheels, I claim—

1. The combination, in a wringer, of slotted side pieces, A A, and slides E, adapted to said slots and provided with external brackets or offsets, each constituting the bearings for the journals of a pair of anti-friction rollers arranged to form the bearings of the upper-roller shaft, as set forth.

2. The slotted side pieces, A A, provided with external brackets, *d*, each supporting the journals of a pair of anti-friction wheels, which constitute the bearings of the shaft of the lower roller, as set forth.

3. The combination, with a frame of a wringer, of anti-friction wheels *d*′ *d*′, constituting the bearings of the lower shaft, and slides carrying wheels *h h*, constituting the bearings of the upper shaft, and provided with recesses 10, for the passage of said shaft, substantially as set forth.

4. The combination of the side pieces, A, having slots *b* and notches *c*, and the wheel-carrying slides E, having lugs *i i*′, arranged on different vertical planes, substantially as set forth.

In testimony whereof I have signed my name to this specification in the presence of two subscribing witnesses.

JAMES TODD.

Witnesses:
GEO. W. HUMBERT,
ANDREW HUMBERT.